June 29, 1954   G. R. LE BROCK   2,682,321
CHANNEL STRIP COUPLING FOR LIGHTING FIXTURES
Filed June 10, 1950
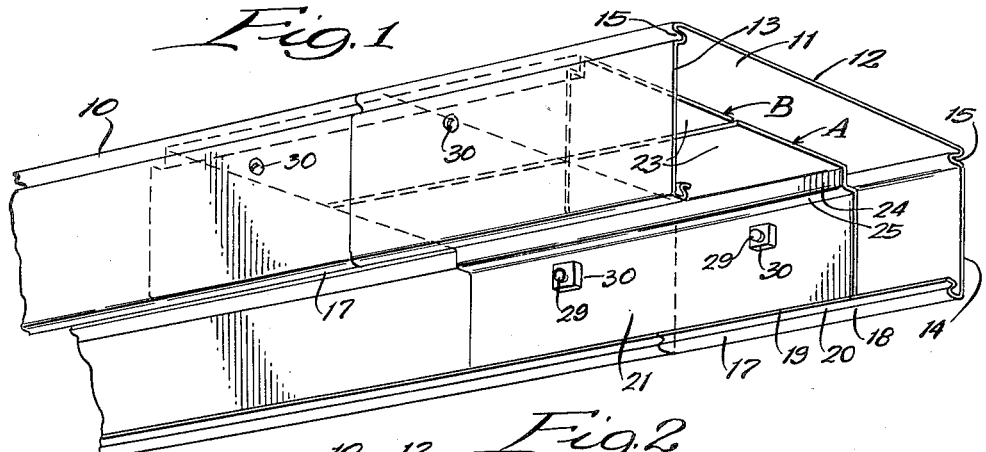
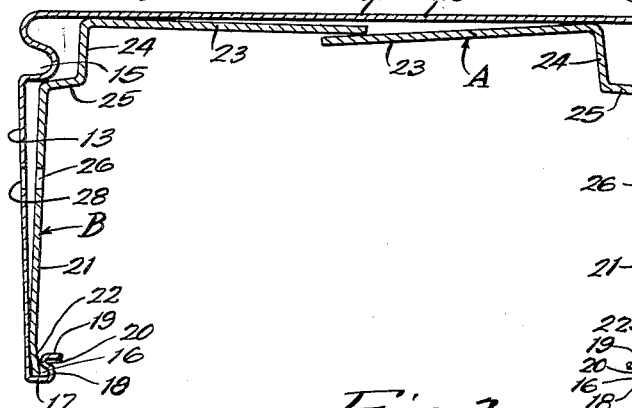
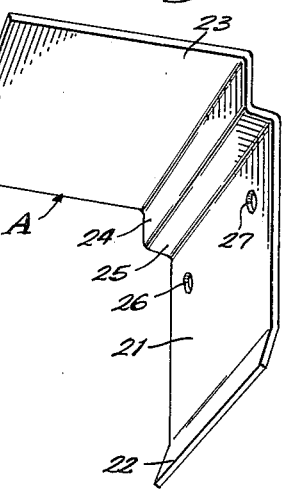
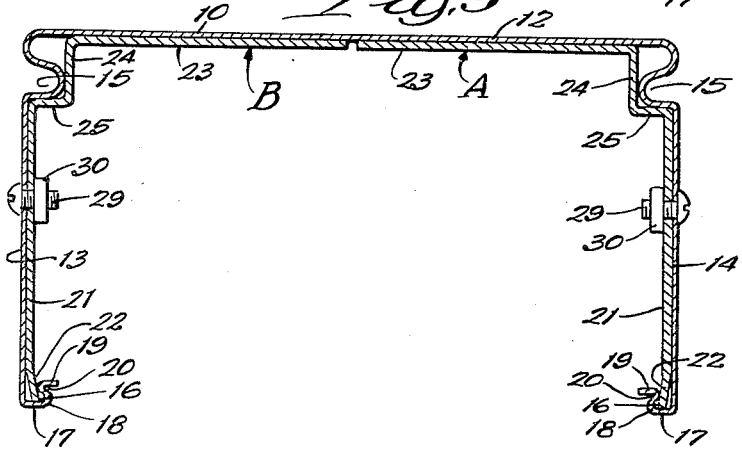
INVENTOR:
Glen R. LeBrock,
BY Dawson, Orms, Booth and Hengeveld,
ATTORNEYS.

Patented June 29, 1954

2,682,321

UNITED STATES PATENT OFFICE 2,682,321

CHANNEL STRIP COUPLING FOR LIGHTING FIXTURES

Glen R. Le Brock, Chicago, Ill., assignor to Curtis Lighting, Inc., Chicago, Ill., a corporation of Illinois Application June 10, 1950, Serial No. 167,472

4 Claims. (Cl. 189—36)

This invention relates to a coupling member and particularly to couplings for joining channel strips employed in ceiling lighting fixtures and like structures.

Most coupling members which have heretofore been employed for connecting channel strips to effect a continuous lighting arrangement or a predetermined lighting assembly in a ceiling structure have been incapable of militating against a bowing effect at the connection when the channel members are weighted down by ballasts and other lighting appurtenances. The effect of such bowing has been to disrupt the desired alignment and, in addition to the bowing effect, the coupling members heretofore employed have been unable to maintain proper lengthwise alignment between units.

It is an object of this invention to produce a coupling member composed of relatively few simple parts which may be easily installed to effect an assembled relation wherein the connected parts do not bow under heavy load and which operate automatically to bring and hold the channel members in proper alignment. The later effect occurs as an incidence in the establishment of assembled relation.

More particularly, it is an object of this invention to produce a coupling of the type described for use in connecting channel strip members having continuous integral flanges upturned in closely spaced apart relation with the free ends of the corresponding side walls of the channel strip to provide a continuous upwardly extending groove disposed inwardly along the lower edge of the side walls and continuous indentures or grooves in each side wall adjacent the top wall portion.

These and other objects and advantages of this invention will hereinafter appear and for purposes of illustration but not of limitation, an embodiment of this invention is shown in the accompanying drawing in which:

Figure 1 is a perspective view of a pair of channel strips joined by a coupling embodying features of this invention;

Figure 2 is a sectional elevational view of the parts shown in Figure 1, but showing the position of the coupling members prior to their actuation to their assembled relation;

Figure 3 is a sectional view corresponding to that of Figure 2 showing the parts in their assembled relation and Figure 4 is a perspective view of one section of the coupling member.

A coupling member embodying features of this invention is illustrated in the drawing as used to connect elongate channel members 10 and 11 in aligned end to end relation. The channel members are of rectangular cross-section having a top wall 12 and depending side walls 13 and 14 respectively. A continuous indenture or groove 15 is formed in each side wall portion adjacent the top wall for receiving clamping means or other like members for positioning the channel strips in the ceiling. Continuous upwardly extending grooves 16 are formed at the lower edge portions of the side walls by integral inwardly extending flanges 17 having end portions shaped to provide an outwardly and upwardly inclined portion 18 followed by inwardly extending portions 19 which form facing holder plate receiving grooves 20. The identified Z-shaped flanged members are placed inwardly a short distance from their associated side walls.

The coupling member is formed of a pair of substantially identical parts A and B, each of which has a relatively flat side wall portion 21, the lower edge portion 22 being turned inwardly to engage the rear wall of the Z-shaped section when the side wall 21 is flush with the side wall 14 of the channel strip in the assembled relation.

The top wall 23 of the coupling part is relatively flat and is formed normally to extend at an angle slightly greater than 90 degrees from the plane of the side wall 21, such for example as at an angle of about 92°.

The top and side walls 23 and 21 respectively are connected by a vertically disposed portion 24 integral with a horizontally disposed portion 25, forming a continuous groove in the upper corner in which the indenture 15 is disposed when in the assembled relation. For the purposes of providing substantial tensional engagement between the coupling part and the channel strip to minimize bowing, the horizontally disposed section 25 may be formed to extend inwardly and upwardly at an angle greater than 90° with the side wall and preferably greater than the angle by which the top wall extends from the side wall. A suitable angle may be in the range of about 105° with the side wall. In the assembled relation the horizontally disposed portion is flexed downwardly through the major portion of its length responsive to engagement with the lower wall of the indented portion which extends almost at right angles from the side wall 28.

Two or more longitudinally spaced openings 26 and 27 are provided in the upper portion of each side wall 21. At least one of the openings is adapted to be in registry with a similarly disposed opening 28 in the side wall of one channel member while one or more of the openings is adapted to be in registry with a similarly disposed opening in the side wall of the other channel member when they are arranged in end to end relation.

In operation, the inturned end portion 22 of the side wall 21 is inserted in the groove 16. Bolt members 29 are inserted through the registered openings for threaded engagement with nut members 30 on the through extending portion. Upon turning the bolt or nut members to advance the nut onto the bolt, the side wall portions 21 and 14 are drawn together. As the walls converge, the tapered section 25 resiliently engages the under side of the indenture 15, and the top wall 23 is flexed inwardly upon engagement with the top wall 12 of the channel member to establish full contact of a forceful nature between the engaged parts. When the side walls 21 and 14 are drawn together in the assembled relation, the turned end portion 22 is tensioned between the engaged side wall and the inner wall of the Z-shaped flanged section and, as a consequence of such seating relation, the side wall members of the joined channel strips are brought and firmly held in proper longitudinal alignment.

After section A is assembled in the manner described, the other section B may be installed in the same manner to couple the channel sections. The coupling members are fully concealed in their assembled relation and they are disposed in a manner which does not interfere with any of the other functional characteristics of the channel strips.

It will be understood that numerous changes may be made in the details of construction, arrangement, and operation without departing from the spirit of the invention, especially as defined in the following claims.

What is claimed is:

1. A coupling comprising in combination channel members arranged in end to end relation and including a top wall with side walls depending substantially perpendicularly from the edges thereof having flanges extending inwardly and upwardly towards the channel member side walls from the lower edges of the side walls and a continuous indenture in the side walls adjacent the top wall, coupling parts positioned in operative engagement with the opposite side walls each of which comprises a resilient strip of rigid sheet material having a side wall dimensioned to correspond with the side wall of the channel members and a top wall dimensioned to be less than half the width of the channel members and extending from the coupling side wall at an angle slightly greater than the angle between the top wall and the side walls of the channel members, each of said coupling parts also having an inturned portion along the lower edge of the coupling side wall which seats against the flanges of the channel members and a grooved portion connecting the side wall with the top wall and in which the indentures of the channel members are disposed and means securing the coupling parts in its assembled relation with the channel members.

2. A coupling comprising in combination channel members arranged in end to end relation and including a top wall with the side walls depending substantially perpendicularly from the edges thereof having flanges extending inwardly and upwardly towards the channel member side walls from the lower edges of the side walls and a continuous indenture in the side walls adjacent the top wall, coupling parts positioned in operative engagement with the opposite side walls each of which comprises a resilient strip of rigid sheet material having a side wall dimensioned to correspond with the side wall of the channel members and a top wall dimensioned to be less than half the width of the channel members and extending from the coupling side wall at an angle slightly greater than the angle between the top wall and the side walls of the channel members, each of said coupling parts also having a vertically disposed portion and an integral horizontally disposed portion connecting the coupling top wall with the coupling side wall with a grooved portion therebetween in which the continuous indenture seats and an inturned portion along the lower edge of the coupling side walls which seats against the flanges and means securing the coupling parts in its assembled relation with the channel members.

3. A coupling part as claimed in claim 2 in which the horizontally disposed portion extends from the coupling side wall at an angle slightly greater than the angle between the top wall and the side wall of the channel members.

4. A coupling member comprising a resilient strip of rigid material including a side wall having openings therein in longitudinally spaced apart relation, a top wall disposed at slightly greater than 90° with respect to the side wall, a vertically disposed portion and a horizontally disposed portion connecting the side wall to the top wall forming an indenture therebetween, said horizontally disposed portion extending from the side wall at an angle slightly greater than that existing between the top wall and the side wall, and an inturned portion in the lower edge of the side wall.

References Cited in the file of this patent

UNITED STATES PATENTS

| Number | Name | Date |
|---|---|---|
| 1,780,553 | Flagge | Nov. 4, 1930 |
| 2,090,239 | Strang | Aug. 17, 1937 |
| 2,250,276 | Rutherford et al. | July 22, 1941 |
| 2,291,491 | Naysmith | July 28, 1942 |
| 2,434,781 | Kurtzon | Jan. 20, 1948 |
| 2,531,232 | Naysmith | Nov. 21, 1950 |
| 2,532,023 | Guth, Jr. | Nov. 28, 1950 |

FOREIGN PATENTS

| Number | Country | Date |
|---|---|---|
| 24,544 of 1935 | Australia | of 1936 |